United States Patent
Yin et al.

(10) Patent No.: US 9,083,889 B2
(45) Date of Patent: Jul. 14, 2015

(54) SIGNAL PROCESSING CIRCUIT CAPABLE OF SELECTIVELY ADJUSTING GAIN FACTOR OF SAMPLE-AND-HOLD CIRCUIT AND SIGNAL PROCESSING METHOD THEREOF

(75) Inventors: Ping-Hung Yin, Grand Cayman (KY); Shih-Feng Chen, Grand Cayman (KY)

(73) Assignee: Himax Imaging, Inc., Grand Cayman (KY)

( * ) Notice: Subject to any disclaimer, the term of this patent is extended or adjusted under 35 U.S.C. 154(b) by 783 days.

(21) Appl. No.: 12/714,536

(22) Filed: Feb. 28, 2010

(65) Prior Publication Data
US 2011/0211100 A1    Sep. 1, 2011

(51) Int. Cl.
*H04N 5/235* (2006.01)

(52) U.S. Cl.
CPC .................................. *H04N 5/2355* (2013.01)

(58) Field of Classification Search
CPC ..... H04N 5/357; H04N 5/3575; H04N 5/378; H04N 5/2355; H04N 25/505
USPC .............................................. 348/222.1, 255
See application file for complete search history.

(56) References Cited

U.S. PATENT DOCUMENTS

| | | | | |
|---|---|---|---|---|
| 5,051,707 A * | 9/1991 | Fujita | .............................. | 330/279 |
| 6,344,778 B1 * | 2/2002 | Nakamura et al. | ............... | 331/34 |
| 6,486,808 B1 * | 11/2002 | Seppi et al. | .................... | 341/139 |
| 6,791,378 B2 | 9/2004 | Rossi | | |
| 7,463,282 B2 * | 12/2008 | Nakamura et al. | .......... | 348/207.1 |
| 8,106,975 B2 * | 1/2012 | Yin | ................................ | 348/243 |
| 8,203,779 B2 * | 6/2012 | Chiu et al. | ...................... | 359/300 |
| 8,536,949 B1 * | 9/2013 | Perlow et al. | .................. | 330/284 |
| 2004/0017495 A1 | 1/2004 | Funakoshi | | |
| 2004/0080637 A1 * | 4/2004 | Nakamura et al. | ............. | 348/255 |
| 2007/0115377 A1 | 5/2007 | Noda | | |
| 2008/0070535 A1 * | 3/2008 | Liou | ........................... | 455/232.1 |
| 2009/0027524 A1 * | 1/2009 | Cho | ............................... | 348/255 |

(Continued)

FOREIGN PATENT DOCUMENTS

| CN | 1477860 A | 2/2004 |
|---|---|---|
| CN | 1968360 A | 5/2007 |

(Continued)

OTHER PUBLICATIONS

Sakakibara, M.; Kawahito, S.; Handoko, D.; Nakamura, N.; Satoh, H.; Higashi, M.; Mabuchi, K.; Sumi, H., "A high-sensitivity CMOS image sensor with gain-adaptive column amplifiers," IEEE Journal of Solid-State Circuits, vol. 40, No. 5, pp. 1147-1156, May 2005.
Kawai, N.; Kawahito, Shoji, "Measurement of low-noise column readout circuits for CMOS image sensors, " IEEE Transactions on Electron Devices, vol. 53, No. 7, pp. 1737-1739, Jul. 2006.

*Primary Examiner* — Roberto Velez
*Assistant Examiner* — Cynthia Segura
(74) *Attorney, Agent, or Firm* — Winston Hsu; Scott Margo

(57) ABSTRACT

A signal processing circuit including an amplifying circuit, a control circuit, and a sample-and-hold circuit is provided. The amplifying circuit receives an analog input signal and outputs a first analog signal by amplifying the analog input signal. The control circuit outputs a control signal according to the analog input signal. The sample-and-hold circuit is coupled to the amplifying circuit and the control circuit to selectively adjust a gain factor of the sample-and-hold circuit according to the control signal, thereby outputting a second analog signal according to the first analog signal and the gain factor.

24 Claims, 6 Drawing Sheets

(56) References Cited

U.S. PATENT DOCUMENTS

2009/0190018 A1 7/2009 Sakakibara
2010/0188275 A1* 7/2010 Kaihara et al. ............... 341/132
2013/0287238 A1* 10/2013 Chen et al. .................... 381/321

FOREIGN PATENT DOCUMENTS

| TW | 200605494 | 2/2006 |
| TW | 200939758 | 9/2009 |

* cited by examiner

SIGNAL PROCESSING CIRCUIT CAPABLE OF SELECTIVELY ADJUSTING GAIN FACTOR OF SAMPLE-AND-HOLD CIRCUIT AND SIGNAL PROCESSING METHOD THEREOF

BACKGROUND OF THE INVENTION

1. Field of the Invention

The present invention relates to a CMOS image sensor (CIS) system, and more particularly, to a signal processing circuit of the CIS system which is capable of improving the dynamic range of the output signal with high processing speed.

2. Description of the Prior Art

In a conventional CMOS image sensor (CIS) system, the dynamic range of the output signal is excessively restricted. For enhancing the dynamic range of the output signal of the CIS system to achieve high dynamic range (HDR), an existing solution is to provide longer exposure time for darker signal and to provide shorter exposure time for brighter signal. Besides, another existing solution is to augment the resolution of the ADC of the CIS system. However, employing the conventional solutions mentioned above inevitably increases the product cost.

Moreover, the existing manners for enlarging the dynamic range of the CIS system are time-wasting and require high circuit complexity. There is a demand for providing a novel signal processing method and signal processing circuit to enhance the dynamic range of the output signal to thereby promote the performance of the CIS system without greatly increasing the product cost.

SUMMARY OF THE INVENTION

It is therefore one of the objectives of the present invention to provide a signal processing circuit to enhance the dynamic range and promote the performance of the CIS system which adopts the signal processing circuit.

According to one aspect of the present invention, a signal processing circuit is provided. The signal processing circuit includes an amplification circuit, a control circuit, and a sample-and-hold circuit. The amplifying circuit receives an analog input signal and outputs a first analog signal by amplifying the analog input signal. The control circuit outputs a control signal according to the analog input signal. The sample-and-hold circuit is coupled to the amplifying circuit and the control circuit, and selectively adjusts a gain factor of the sample-and-hold circuit according to the control signal to thereby output a second analog signal according to the first analog signal and the gain factor.

According to another aspect of the present invention, a signal processing method is provided. The signal processing method includes the following steps: receiving an analog input signal and outputting a first analog signal by amplifying the analog input signal; outputting a control signal according to the analog input signal; selectively adjusting a gain factor of a sample-and-hold circuit according to the control signal; and utilizing the sample-and-hold circuit to output a second analog signal according to the first analog signal and the gain factor.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following descriptions and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
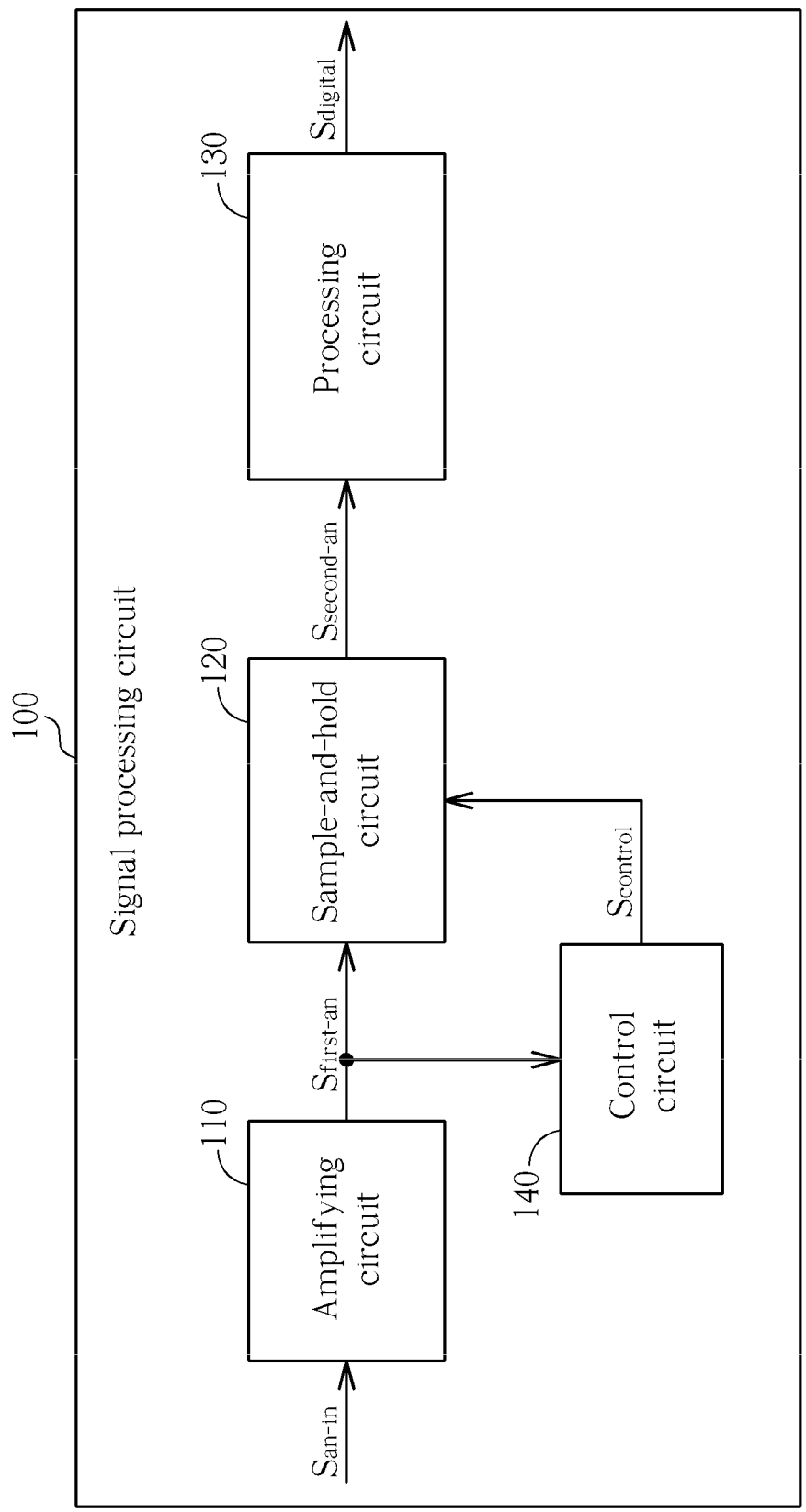
FIG. 1 is a block diagram illustrating a first exemplary embodiment of a signal processing circuit of the present invention.

Please refer to FIG. 1. FIG. 1 is a block diagram illustrating a first exemplary embodiment of a signal processing circuit of the present invention. In this exemplary embodiment, the signal processing circuit 100 includes (but is not limited to) an amplifying circuit 110, a sample-and-hold circuit 120, a processing circuit 130, and a control circuit 140. The signal processing circuit 100 receives a sensed signal from a CMOS Image Sensor (CIS) and enhances the dynamic range of the output digital signal by an adaptive control mechanism (e.g., the control circuit 140). When the sensed signal (i.e., an analog input signal San-in) has a poor signal-to-noise ratio (SNR), a gain factor of the sample-and-hold circuit 120 can be increased correspondingly according to a control signal $S_{control}$ generated by the control circuit 140. When the amplitude of the sensed signal (i.e., the analog input signal $S_{an-in}$) is too high, the gain factor of the sample-and-hold circuit 120 can be appropriately reduced under the control of the control circuit 140 to avoid saturation of the following signal stage (e.g., an analog-to-digital conversion). That is, by adopting the signal processing circuit and the signal processing method of the present invention, a novel solution to provide the desired high dynamic range (HDR) performance is achieved.

In detail, when the analog input signal $S_{an-in}$ is fed into the signal processing circuit 100, the amplifying circuit 110 first amplifies the magnitude of the analog input signal $S_{an-in}$ to generate a first analog input signal $S_{first-an}$, wherein a signal-to-noise ratio of the first analog input signal $S_{first-an}$ is identical to that of the analog input signal $S_{an-in}$ since the amplifying circuit 110 amplifies the magnitude (e.g., voltage) of the analog input signal $S_{an-in}$ to generate the first analog input signal $S_{first-an}$ in a linear manner. In one exemplary embodiment of the present invention, a programmable gain amplifier (PGA) is used to realize the amplifying circuit 110; however, this is for illustrative purposes only and any circuit capable of amplifying the analog input signals $S_{an-in}$ can be used as the amplifying circuit 110 inside the signal processing circuit 100.

Herein the sample-and-hold circuit 120 with a variable gain factor to provide a better dynamic range of the output signal of the CIS system is proposed in the present invention. For instance, the sample-and-hold circuit 120 receives the first analog signal $S_{first-an}$ and also amplifies the first analog signal $S_{first-an}$ according to the variable gain factor, where the variable gain factor is determined according to the control signal $S_{control}$. The control circuit 140 generates the control signal $S_{control}$ for adjusting the gain factor of the sample-and-hold circuit 120 according to the strength of the first analog signal $S_{first-an}$ generated from the amplifying circuit 110. In FIG. 1, the control circuit 140 receives the first analog signal $S_{first-an}$ to generate the control signal $S_{control}$ by comparing the first analog signal $S_{first-an}$ with threshold value(s). In one exemplary embodiment, the control circuit 140 may compare the first analog signal $S_{first-an}$ with a predetermined threshold value to determine the control signal $S_{control}$; when the comparing result indicates that the strength (e.g., a voltage level) of the first analog signal $S_{first-an}$ is smaller than the predetermined threshold value, meaning that the strength of the first analog signal $S_{first-an}$ is weak, the control circuit 140 will set the gain factor with a larger gain value. On the other hand, when the comparing result indicates that the first analog signal $S_{first-an}$ is strong due to the strength of the first analog signal $S_{first-an}$ being larger than the predetermined threshold value, the control circuit 140 will set the sample-and-hold circuit 120 a smaller gain factor correspondingly via the control signal $S_{control}$. After the gain factor is assigned by a gain value controlled under the control circuit 140, the sample-and-hold circuit 120 generates a second analog signal $S_{second-an}$ according to the adaptively-adjusted gain factor. However, it should be noted that the number of the threshold values is not meant to be a limitation of the present invention; according to different design requirements, the signal processing circuit 100 can use a set of threshold values as references to generate the control signal $S_{control}$. The alternative designs obey and fall into the scope of the present invention.

One application of the signal processing circuit of the present invention is to apply different gain factors to different signal paths, and promote the dynamic range by generating a digital signal $S_{digital}$ via the generated (amplified) analog signals derived from different signal paths.

Figure 2:
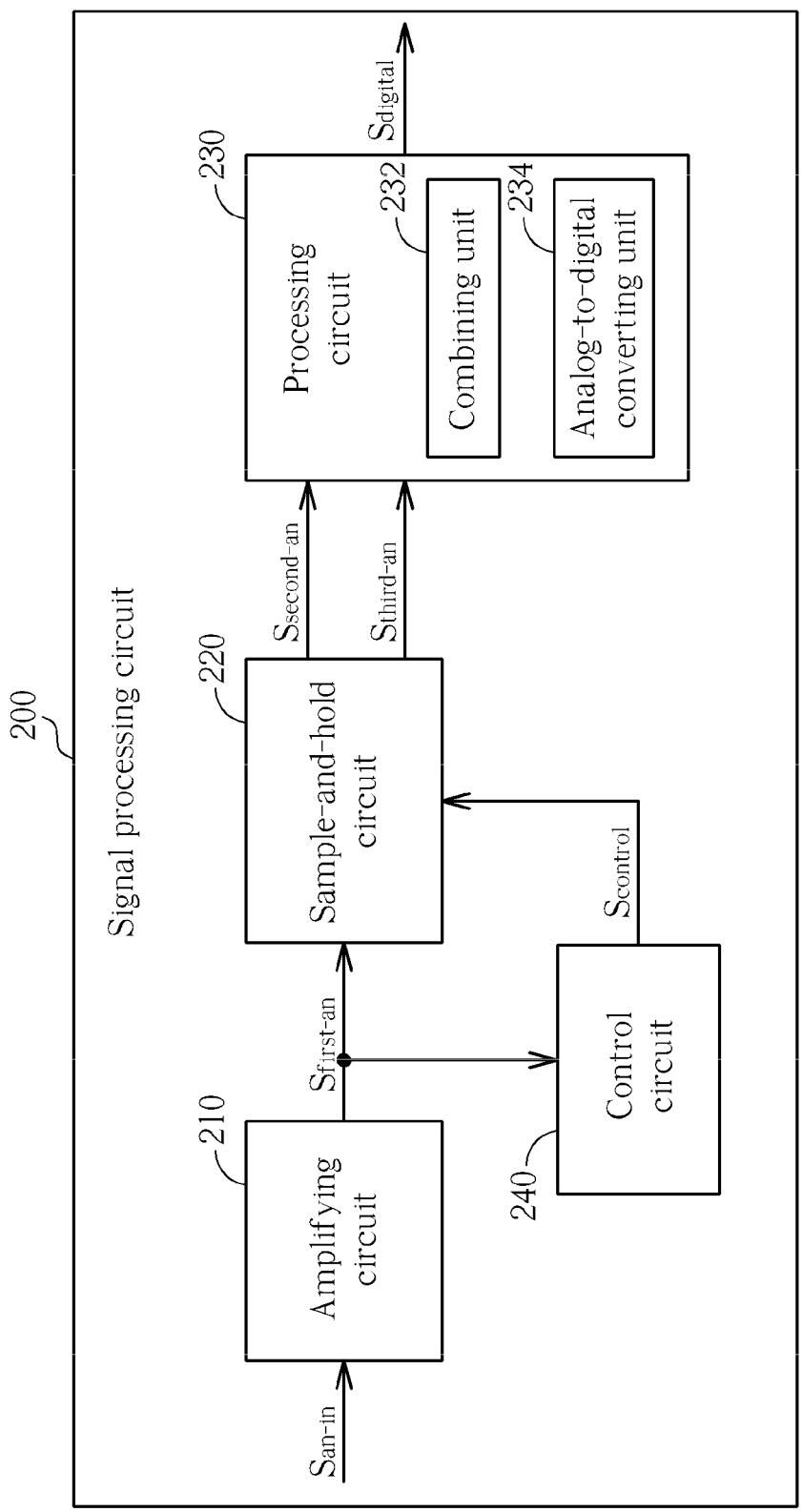
FIG. 2 is a block diagram illustrating a second exemplary embodiment of a signal processing circuit of the present invention.

Please refer to FIG. 2. FIG. 2 is a block diagram illustrating a second exemplary embodiment of a signal processing circuit of the present invention. In this exemplary embodiment, the signal processing circuit 200 includes (but is not limited to) an amplifying circuit 210, a sample-and-hold circuit 220, a processing circuit 230, and a control circuit 240. Since the circuit structures and the operations of the signal processing circuit 200 can be easily understood by referencing the aforementioned descriptions of the signal processing circuit 100, further descriptions are omitted here for the sake of brevity. A main difference between the signal processing circuit 100 and the signal processing circuit 200 is that in the second exemplary embodiment (FIG. 2) the first analog signal $S_{first-an}$ is processed via the sample-and-hold circuit 220 twice. In detail, the sample-and-hold circuit 220 can sample the first analog signal $S_{first-an}$ with a fixed gain factor regardless of the strength of the first analog signal $S_{first-an}$, and hence generate a third analog signal $S_{third-an}$. The processing circuit 230 then generates the digital signal $S_{digital}$ according to both the second analog signal $S_{second-an}$ and the third analog signal $S_{third-an}$; that is, when generating the second analog signal $S_{second-an}$, the gain factor is dynamically adjusted via the control circuit 240 according to the strength of the first analog signal $S_{first-an}$.

To generate the third analog signal $S_{third-an}$, the sample-and-hold circuit 220 samples the first analog signal $S_{first-an}$ with a fixed gain factor without considering the strength of the first analog signal $S_{first-an}$. For example, the processing circuit 230 may include a combining unit 232 and an analog-to-digital converting unit 234. In one implementation, the combining unit 232 combines the second analog signal $S_{second-an}$ and the third analog signal $S_{third-an}$, and the analog-to-digital converting unit 234 outputs the digital signal $S_{digital}$ according to a signal combination result generated from the combining unit 232. In another implementation, the analog-to-digital converting unit 234 converts the second analog signal $S_{second-an}$ and the third analog signal $S_{third-an}$ into respective digital signals, and the combining unit 232 combines the digital signals generated from the analog-to-digital converting unit 234 to output the digital signal $S_{digital}$. It should be noted that the above configurations of the processing circuit 230 are for illustrative purposes only. Other implementations of the processing circuit 230 which receive and process the output generated from the preceding sample-and-hold 220 are feasible. All the alternative designs obey and fall into the scope of the present invention.

In the aforementioned embodiments, the sample-and-hold circuit (120/220) is with a variable gain factor controlled by the control circuit (140/240) via monitoring the signal strength of an analog signal which is not processed by the sample-and-hold circuit (120/220) yet. In one alternative design, the sample-and-hold circuit (120/220) has at least a first capacitor and a second capacitor to determine the magnitude of the gain factor, where at least one of the first and second capacitors is implemented using an adjustable capacitor. Therefore, the gain factor is controlled by a ratio of the capacitive values of the first capacitor and the second capacitor. Alternative design falls into the scope of the present invention.

Figure 3:
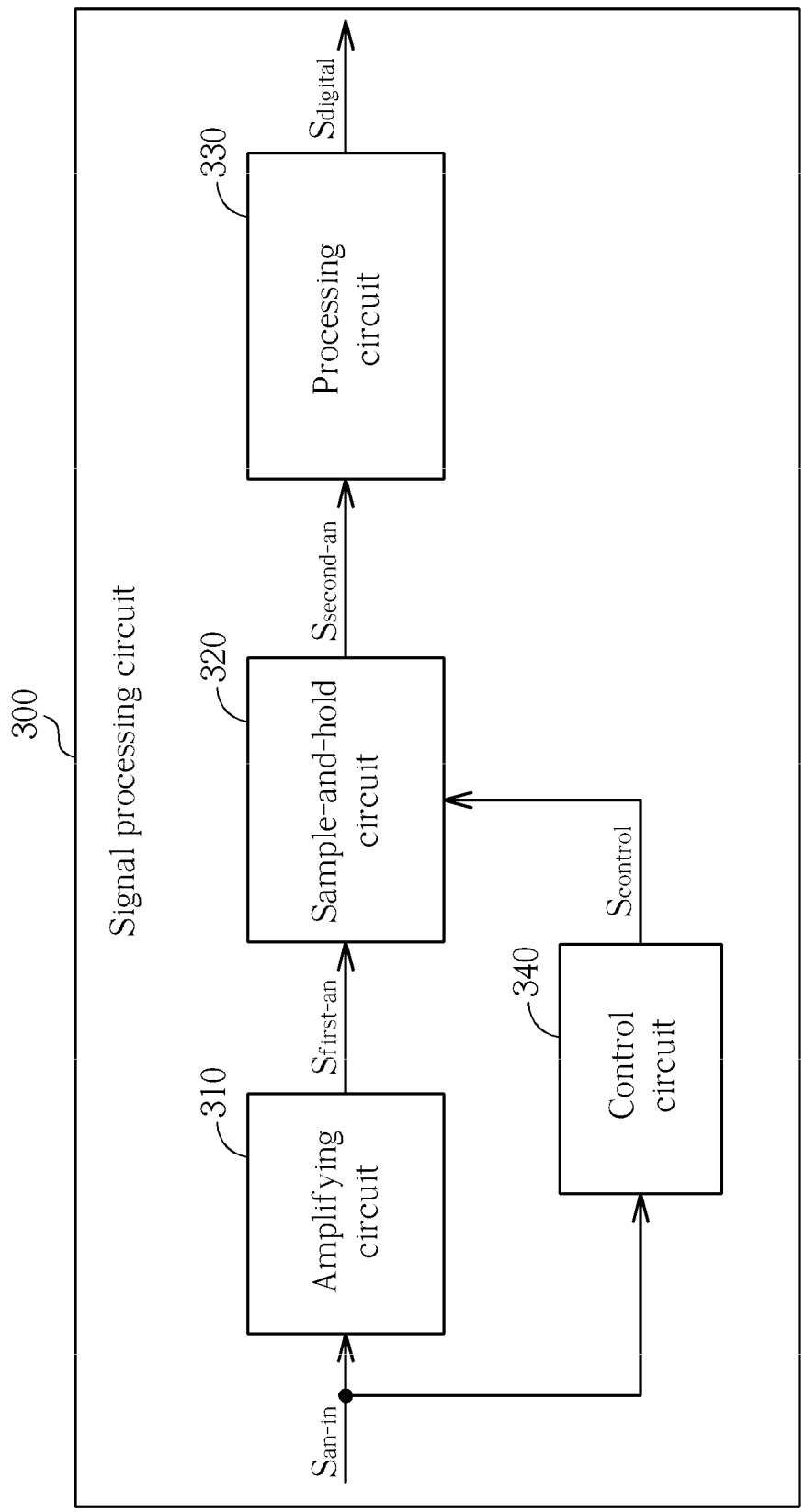
FIG. 3 is a diagram illustrating a third exemplary embodiment of a signal processing circuit of the present invention.

Please refer to FIG. 3. FIG. 3 is a diagram illustrating a third exemplary embodiment of a signal processing circuit of the present invention. The configuration and the operation of the signal processing circuit 300 in FIG. 3 are the same as that in FIG. 1, except for the control circuit 340. In this third exemplary embodiment, the control circuit 340 generates the control signal $S_{control}$ to determine the gain value corresponding to the variable gain factor of the sample-and-hold circuit 330 according to the analog input signal $S_{an-in}$ rather than according to the first analog signal $S_{first-an}$ as in the first and second exemplary embodiments of the present invention. Therefore, the control circuit 340 compares the analog input signal $S_{an-in}$ with a predetermined threshold value to determine the control signal $S_{control}$. When the comparing result indicates that the strength (e.g., a voltage level) of the analog input signal $S_{an-in}$ is smaller than the predetermined threshold value, meaning that the strength of the analog signal $S_{an-in}$ is weak, the control circuit 340 will set the gain factor with a larger gain value. On the other hand, when the comparing result indicates that the analog input signal $S_{an-in}$ is strong due to the strength of the first analog signal $S_{first-an}$ being larger than the predetermined threshold value, the control circuit 340 will set the sample-and-hold circuit 320 a smaller gain factor correspondingly via the control signal $S_{control}$. Since the descriptions and the operation of other elements in the signal processing circuit 300 are detailed in above paragraphs directed to the first exemplary embodiment, further descriptions are omitted here for the sake of brevity.

Figure 4:
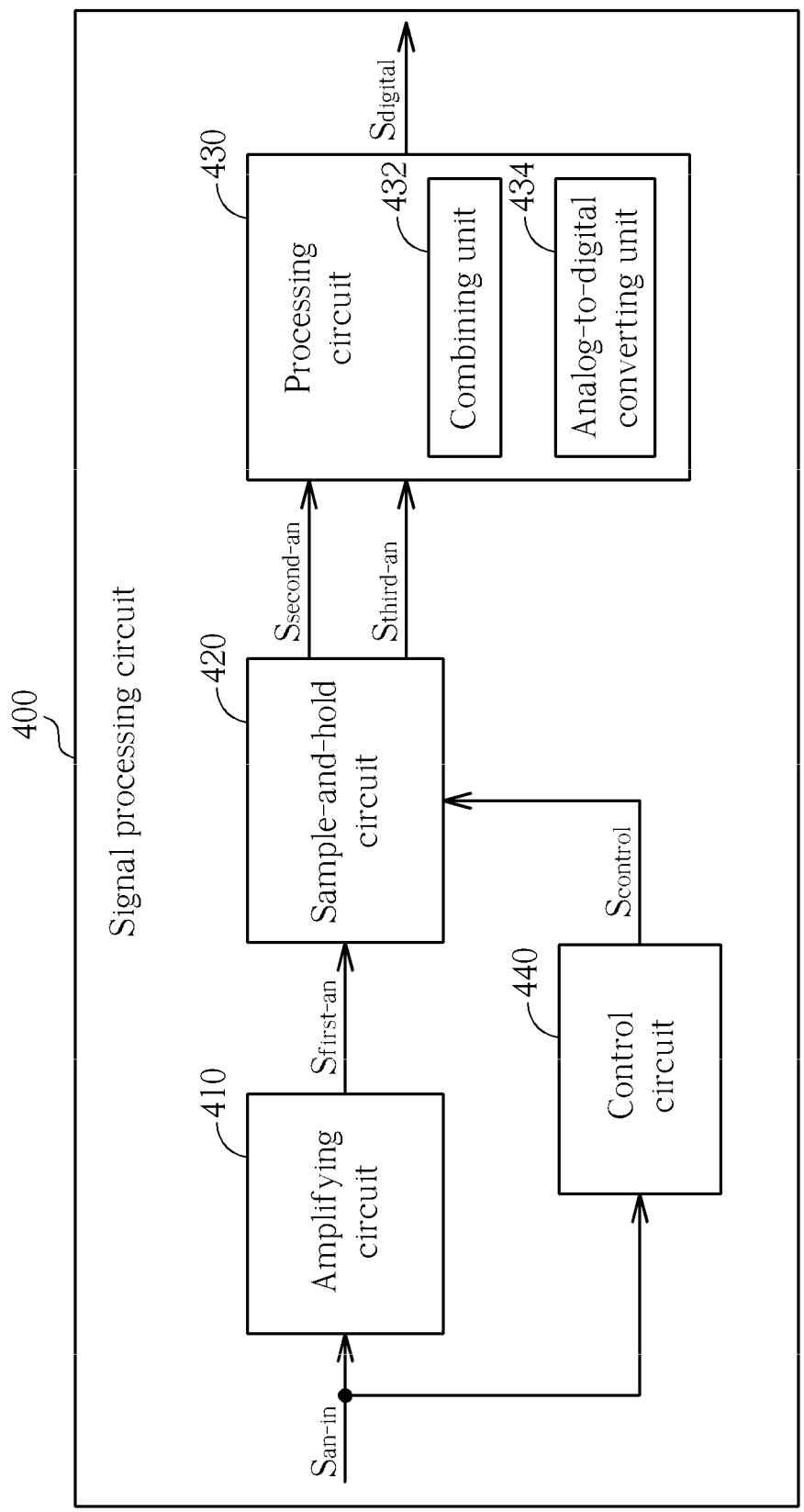
FIG. 4 is a diagram illustrating a fourth exemplary embodiment of a signal processing circuit of the present invention.

Please refer to FIG. 4. FIG. 4 is a diagram illustrating a fourth exemplary embodiment of a signal processing circuit of the present invention. The configuration and the operation of the signal processing circuit 400 in FIG. 4 are the same as that in FIG. 2, except for the control circuit 440. In this fourth exemplary embodiment, the control circuit 440 generates the control signal $S_{control}$ to determine the gain value corresponding to the variable gain factor of the sample-and-hold circuit 420 according to the analog input signal $S_{an-in}$ rather than according to the first analog signal $S_{first-an}$ as in the first and second exemplary embodiments of the present invention. Therefore, the control circuit 440 compares the analog input signal $S_{an-in}$ with a predetermined threshold value to determine the control signal $S_{control}$. Similarly, when the comparing result indicates that the strength (e.g., a voltage level) of the analog input signal $S_{an-in}$ is smaller than the predetermined threshold value, meaning that the strength of the analog signal $S_{an-in}$ is weak, the control circuit 440 will set the gain factor with a larger gain value. On the other hand, when the comparing result indicates that the analog input signal $S_{an-in}$ is strong due to the strength of the first analog signal $S_{first-an}$ being larger than the predetermined threshold value, the control circuit 440 will set the sample-and-hold circuit 420 a smaller gain factor correspondingly via the control signal $S_{control}$.

Like the operations of the sample-and-hold circuit 220 and the processing circuit 230 in FIG. 2, In the fourth exemplary embodiment, the first analog signal $S_{first-an}$ is processed via the sample-and-hold circuit 420 twice. In detail, the sample-and-hold circuit 420 samples the first analog signal $S_{first-an}$ with a fixed gain factor regardless of the strength of the first analog signal $S_{first-an}$, and generate a third analog signal $S_{third-an}$. The processing circuit 430 generates the digital signal $S_{digital}$ according to both the second analog signal $S_{second-an}$ and the third analog signal $S_{third-an}$. That is, when generating the second analog signal $S_{second-an}$, the gain factor is dynamically adjusted via the control circuit 440 according to the strength of the first analog signal $S_{first-an}$. To generate the third analog signal $S_{third-an}$, the sample-and-hold circuit 420 samples the first analog signal $S_{first-an}$ with a fixed gain factor without considering the strength of the first analog signal $S_{first-an}$.

The processing circuit 430 further includes a combining unit 432 and an analog-to-digital converting unit 434 (FIG. 4). In one implementation, the combining unit 432 combines the second analog signal $S_{second-an}$ and the third analog signal $S_{third-an}$, and the analog-to-digital converting unit 434 outputs the digital signal $S_{digital}$ according to a signal combination result generated from the combining unit 432. In another implementation, the analog-to-digital converting unit 434 converts the second analog signal $S_{second-an}$ and the third analog signal $S_{third-an}$ into respective digital signals, and the combining unit 432 combines the digital signals generated from the analog-to-digital converting unit 434 to output the digital signal $S_{digital}$. Since the operations and configurations of the sample-and-hold circuit 420 and the processing circuit 430 are same as that in the second exemplary embodiment, further descriptions are omitted here for the sake of brevity. All the alternative designs obey and fall into the scope of the present invention.

Please note that the aforementioned exemplary embodiments are for illustrative purposes only and not meant to be limitations of the present invention. Any signal processing circuit which adaptively adjusts the gain factor of a sample-and-hold circuit included therein by monitoring the strength of an analog signal directly or indirectly derived from an input analog signal of the signal processing circuit obeys and falls into the scope of the present invention.

Figure 5:
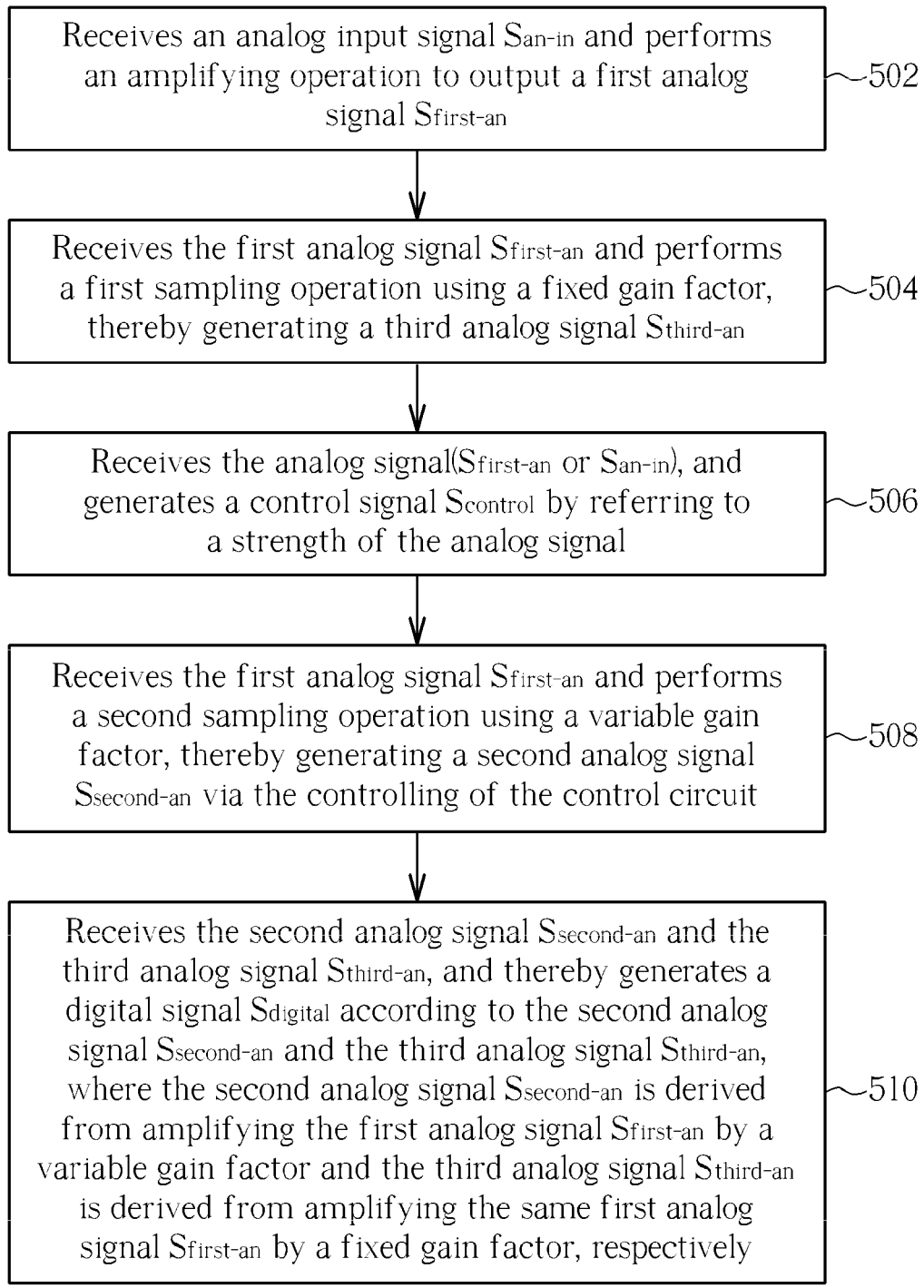
FIG. 5 is a flowchart illustrating operations of a signal processing circuit according to the present invention.

Please refer to FIG. 5 in conjunction with FIG. 2 and FIG. 4. FIG. 5 is a flowchart illustrating operations of a signal processing circuit according to the present invention. Please note that if the result is substantially the same, the steps are not limited to be executed according to the exact order shown in FIG. 5. The operations of the signal processing circuit are briefly summarized using following steps:

Step 502: The amplifying circuit (210/410) receives an analog input signal $S_{an-in}$ and performs an amplifying operation to output a first analog signal $S_{first-an}$ according to the analog input signal $S_{an-in}$.

Step 504: The sample-and-hold circuit (220/420) receives the first analog signal $S_{first-an}$ and performs a first sampling operation using a fixed gain factor, thereby generating a third analog signal $S_{third-an}$. When the sample-and-hold circuit (220/420) executes the first sampling operation, the gain factor of the sample-and hold-circuit is set by a fixed gain value regardless of the strength of an analog signal which is either the first analog signal $Sf_{irst-an}$ in the second exemplary embodiment or the analog input signal $S_{an-in}$ in the fourth exemplary embodiment.

Step 506: The control circuit (240/440) receives the analog signal, either the first analog signal $S_{first-an}$ or the analog input signal $S_{an-in}$, and generates a control signal $S_{control}$ by referring to a strength of the analog signal (i.e., a voltage level of the analog input signal $S_{an-in}$ or a voltage level of the first analog signal $S_{first-an}$).

Step 508: The sample-and-hold circuit (220/420) receives the first analog signal $S_{first-an}$ and performs a second sampling operation using a variable gain factor, thereby generating a second analog signal $S_{second-an}$ via the controlling of the control circuit (240/440). When the sample-and-hold circuit (220/420) executes the second sampling operation, the gain factor of the sample-and-hold circuit is dynamically (adaptively) varied according to the control signal $S_{control}$. For instance, when the control circuit (240/440) determines that the strength of the analog signal (either the first analog signal $S_{first-an}$ or the analog input signal $S_{an-in}$) is too weak, meaning the analog signal has a poor SNR, the control signal $S_{control}$ will set a larger gain value to the variable gain factor of the sample-and-hold circuit (220/420) to equivalently boost the strength of the second analog signal $S_{second-an}$; in addition, when the control circuit (240/440) determines that the strength of the analog signal (either the first analog signal $S_{first-an}$ or the analog input signal $S_{an-in}$) is too strong, the control signal $S_{control}$ will set a smaller gain value to the gain factor of the sample-and-hold circuit (220/420) to equivalently reduce the strength of the second analog signal $S_{second-an}$.

Step 510: The processing circuit (230/430) receives the second analog signal $S_{second-an}$ and the third analog signal $S_{third-an}$, and thereby generates a digital signal $S_{digital}$ according to the second analog signal $S_{second-an}$ and the third analog signal $S_{third-an}$ where the second analog signal $S_{second-an}$ is derived from amplifying the first analog signal $S_{first-an}$ by a variable gain factor and the third analog signal $S_{third-an}$ is derived from amplifying the same first analog signal $S_{first-an}$ by a fixed gain factor, respectively.

Figure 6:
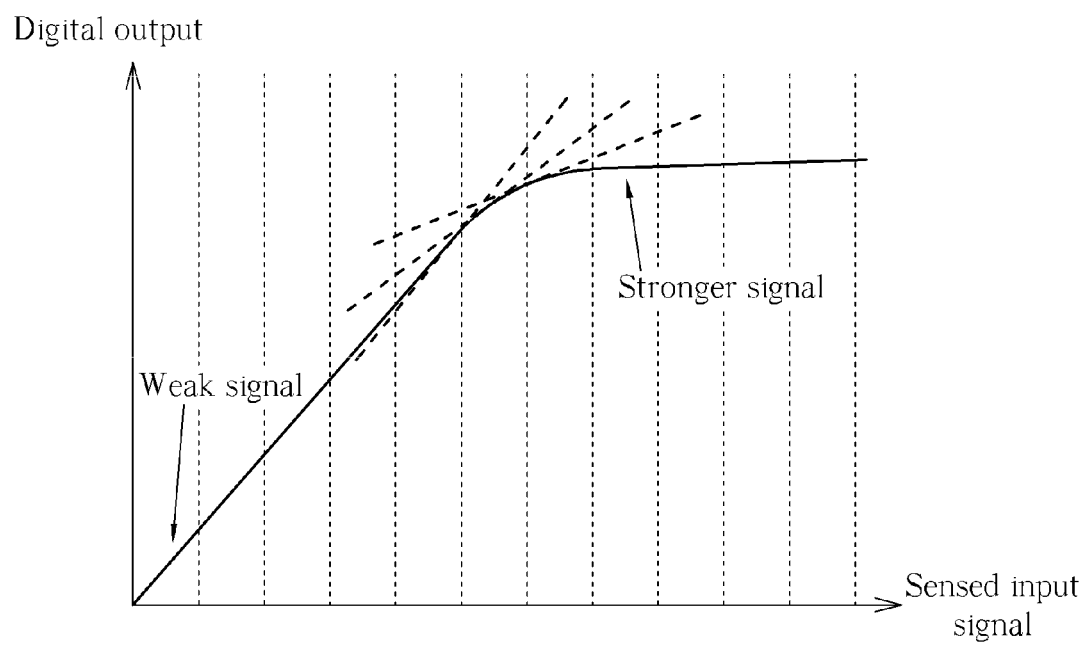
FIG. 6 is a diagram illustrating operating characteristics of the adaptive gain adjustment made by an exemplary signal processing circuit of the present invention.

Please refer to FIG. 6 in conjunction with FIG. 1~FIG. 5. FIG. 6 is a diagram illustrating operating characteristics of the adaptive gain adjustment made by the exemplary signal processing circuit of the present invention. As shown in FIG. 6, when the strength of the input signal of the control circuit is weaker, the control circuit will control the sample-and-hold circuit to sample the first analog signal $S_{first-an}$ with a larger gain value; when the strength of the input signal of the control circuit is stronger, the control circuit will control the sample-and-hold circuit to sample the first analog signal $S_{first-an}$ with a smaller gain value. In this way, the digital signal outputted from the processing circuit (130、230、330、430) will be ensured to have an enhanced dynamic range.

Those skilled in the art will readily observe that numerous modifications and alterations of the device and method may be made while retaining the teachings of the invention.

What is claimed is:

1. A signal processing circuit, comprising:
    an amplifying circuit, for receiving an analog input signal and outputting a first analog signal by amplifying the analog input signal;
    a control circuit, for outputting a control signal according to the analog input signal;
    a sample-and-hold circuit, coupled to the amplifying circuit and the control circuit, for selectively adjusting a gain factor of the sample-and-hold circuit according to the control signal to thereby output a second analog signal according to the first analog signal and the gain factor, and outputting a third analog signal according to the first analog signal and a reference gain factor, wherein the sample-and-hold circuit outputs the second analog signal by sampling the first analog signal with the gain factor, and outputs the third analog signal by sampling the first analog signal with the reference gain factor regardless of a strength of the first analog signal; and
    a processing circuit, coupled to the sample-and-hold circuit, the processing circuit arranged for receiving the second analog signal and the third analog signal to generate an output signal.

2. The signal processing circuit of claim 1, further comprising:
    a processing circuit, coupled to the sample-and-hold circuit, for outputting a digital signal according to at least the second analog signal.

3. The signal processing circuit of claim 2, wherein the processing circuit generates the digital signal according to the second analog signal and the third analog signal.

4. The signal processing circuit of claim 1, wherein the amplifying circuit is a programmable gain amplifier (PGA), and the control circuit refers to the strength of the analog input signal to generate the control signal.

5. The signal processing circuit of claim 4, wherein the control circuit compares the strength of the analog input signal with at least one threshold value to determine the control signal.

6. The signal processing circuit of claim 5, wherein when the strength of the analog input signal is larger than the threshold value, the control signal controls the sample-and-hold circuit to set the gain factor by a first gain value; when the strength of the analog input signal is smaller than the threshold value, the control signal controls the sample-and-hold circuit to set the gain factor by a second gain value different from the first gain value.

7. The signal processing circuit of claim 6, wherein the second gain value is greater than the first gain value.

8. The signal processing circuit of claim 1, wherein the sample-and-hold circuit comprises a first capacitor and a second capacitor which determine the gain factor, and at least one of the first and the second capacitors is an adjustable capacitor.

9. The signal processing circuit of claim 1, wherein the sample-and-hold circuit applies the gain factor to a first signal path in order to generate the second analog signal from the first signal path, and applies the reference gain factor to a second signal path different from the first signal path in order to generate the third analog signal from the second signal path.

10. A signal processing method, comprising:
    receiving an analog input signal and outputting a first analog signal by amplifying the analog input signal;
    outputting a control signal according to the analog input signal;
    selectively adjusting a gain factor of a sample-and-hold circuit according to the control signal;
    utilizing the sample-and-hold circuit to output a second analog signal according to the first analog signal and the gain factor, and to output a third analog signal according to the first analog signal and a reference gain factor, wherein the second analog signal is outputted by sampling the first analog signal with the gain factor, and the third analog signal is outputted by sampling the first analog signal with the reference gain factor regardless of a strength of the first analog signal; and
    utilizing a processing circuit to receive the second analog signal and the third analog signal to generate an output signal.

11. The signal processing method of claim 10, further comprising:
    outputting a digital signal according to at least the second analog signal.

12. The signal processing method of claim 11, wherein the step of outputting the digital signal comprises: outputting the digital signal according to the second analog signal and the third analog signal.

13. The signal processing method of claim 10, wherein the step of outputting the control signal according to the analog input signal comprises: determining the control signal by referring to the strength of the analog input signal.

14. The signal processing method of claim 13, wherein the step of determining the control signal by referring to the strength of the analog input signal comprises:
    determining the control signal by comparing the strength of the analog input signal with at least one threshold value; wherein when the strength of the analog input signal is larger than the threshold value, the control signal controls the sample-and-hold circuit to set the gain factor by a first gain value; when the strength of the analog input signal is smaller than the threshold value, the control signal controls the sample-and-hold circuit to set the gain factor by a second gain value different from the first gain value.

15. The signal processing method of claim 10, wherein the second analog signal is derived from a first signal path that the gain factor is applied to, the third analog signal is derived from a second signal path that the reference gain factor is applied to, and the first signal path is different from the second signal path.

16. A signal processing circuit, comprising:
    an amplifying circuit, for receiving an analog input signal and outputting a first analog signal by amplifying the analog input signal;
    a control circuit, for outputting a control signal according to the first analog input signal;
    a sample-and-hold circuit, coupled to the amplifying circuit and the control circuit, for selectively adjusting a gain factor of the sample-and-hold circuit according to the control signal to thereby output a second analog signal according to the first analog signal and the gain factor, and outputting a third analog signal according to the first analog signal and a reference gain factor, wherein the sample-and-hold circuit outputs the second analog signal by sampling the first analog signal with the gain factor, and outputs the third analog signal by sampling the first analog signal with the reference gain factor regardless of a strength of the first analog signal; and a processing circuit, coupled to the sample-and-hold circuit, the processing circuit arranged for receiving the second analog signal and the third analog signal to generate an output signal.

17. The signal processing circuit of claim 16, wherein the amplifying circuit is a programmable gain amplifier (PGA), and the control circuit refers to the strength of the first analog signal to generate the control signal.

18. The signal processing circuit of claim 17, wherein the control circuit compares the strength of the first analog signal with at least one threshold value to determine the control signal.

19. The signal processing circuit of claim 18, wherein when the strength of the first analog signal is larger than the threshold value, the control signal controls the sample-and-hold circuit to set the gain factor by a first gain value; when the strength of the first analog signal is smaller than the threshold value, the control signal controls the sample-and-hold circuit to set the gain factor by a second gain value different from the first gain value.

20. The signal processing circuit of claim 19, wherein the second gain value is greater than the first gain value.

21. A signal processing method, comprising:
receiving an analog input signal and outputting a first analog signal by amplifying the analog input signal;
outputting a control signal according to the first analog signal;
selectively adjusting a gain factor of a sample-and-hold circuit according to the control signal;
utilizing the sample-and-hold circuit to output a second analog signal according to the first analog signal and the gain factor, and to output a third analog signal according to the first analog signal and a reference gain factor, wherein the second analog signal is outputted by sampling the first analog signal with the gain factor, and the third analog signal is outputted by sampling the first analog signal with the reference gain factor regardless of a strength of the first analog signal; and
utilizing a processing circuit to receive the second analog signal and the third analog signal to generate an output signal.

22. The signal processing method of claim 21, wherein the step of outputting the control signal according to the first analog signal comprises: determining the control signal by referring to the strength of the first analog signal.

23. The signal processing method of claim 22, wherein the step of determining the control signal by referring to the strength of the first analog signal comprises:
determining the control signal by comparing the strength of the first analog signal with at least one threshold value.

24. The signal processing method of claim 23, wherein when the strength of the first analog signal is larger than the threshold value, the control signal controls the sample-and-hold circuit to set the gain factor by a first gain value; when the strength of the first analog signal is smaller than the threshold value, the control signal controls the sample-and-hold circuit to set the gain factor by a second gain value different from the first gain value.

* * * * *